April 18, 1939. T. O. R. DAHLBERG 2,154,495
INDICATOR WHEEL FOR CASH REGISTERS AND THE LIKE
Filed Jan. 31, 1938
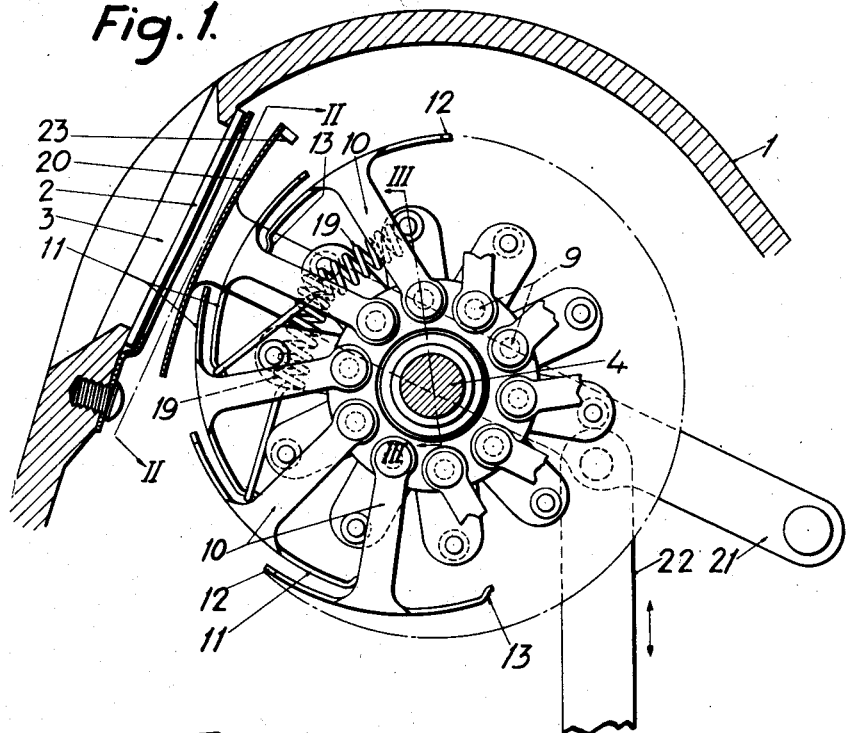
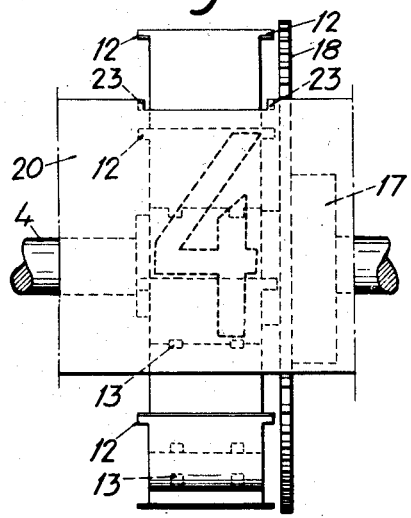
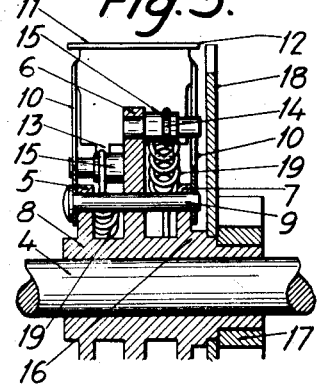
TORD OLOF RICKARD DAHLBERG
INVENTOR Patented Apr. 18, 1939

2,154,495

UNITED STATES PATENT OFFICE 2,154,495

INDICATOR WHEEL FOR CASH REGISTERS AND THE LIKE

Tord Olof Rickard Dahlberg, Stockholm, Sweden, assignor to Kooperativa Förbundet, Förening u. p. a., Stockholm, Sweden Application January 31, 1938, Serial No. 187,840 In Sweden February 2, 1937

5 Claims. (Cl. 235—1)

The heretofore customary indicator wheels used in cash registers and the like have a disadvantage, which in some cases makes it necessary to abandon these wheels with their simple driving and operating members and to substitute therefor much more complicated devices. The disadvantage referred to above consists therein that, when for reasons of space or for other reasons the diameter of the wheels has to be limited, the designations of the wheels become so small that it is difficult to clearly read the same at a certain desired distance from the apparatus. The present invention has for its object to overcome this disadvantage and to provide in indicator wheels of relatively small diameters clear and easily readable designations, which on a heretofore customary indicator wheel would require a considerably larger diameter of the said wheel than in wheels according to the invention. According to the present invention, this object is accomplished by means of an indicator wheel comprising a plurality of arms extending outwardly from the center of the wheel. Each of said arms has one end thereof swingably united with a part rotatable on the axis of rotation of the wheel, the other ends of the arms, which are swingable in peripherical direction, carrying a number of arcuate plates, extending in substantially peripherical direction and normally overlapping one another, one of said plates at a time being arranged to be uncovered in a certain position (position for reading).

An embodiment of the invention is illustrated on the accompanying drawing, in which Figure 1 shows an indicator wheel in side view, Figure 2 and 3 sections on the lines II—II and III—III in Figure 1, respectively.

In the drawing 1 indicates part of the casing of the cash register provided with a reading opening covered by a window 2. 4 indicates the shaft for carrying the indicator wheel. On the said shaft there is rotatably mounted a part 8 provided with three flanges 5, 6, 7. With the flanges 5 and 7 there are, by means of pins 9, swingably united arms 10, formed integral with arcuate plates 11, which in the embodiment shown are ten in number. Thus, each pair of arms 10 with the corresponding plate 11, which latter may be provided with one of the numbers 0–9, constitute a yoke-shaped member, the transverse part of which, formed by the plate 11, is somewhat narrower than the distance between the arms 10 forming the yoke legs. At its one end each plate 11 is provided with two shoulders 12 protruding in opposite transverse directions of the plate, and at its other end with two hook-shaped portions 13. In the star-shaped flange 6 of the part 8, there are secured pins 15 provided with annular grooves 14. Alternate pins 15 project in opposite directions beyond the flanges 5 and 6, respectively, so as to form stops for the arms 10 and to limit the peripherical swinging movements of the said arms in both directions. Alternate pins 15 have the annular grooves 14 on opposite sides of the flange 6, and each annular groove receives one end coil of a tension spring 19, the other end of which is connected with one of the hook-shaped portions 13 of a plate 11. By the action of the springs 19 the plates 11 and the arms 10, respectively, are normally held in their positions shown in Figure 1.

In the embodiment shown the part 8 is provided with a sleeve-shaped extension 16, which serves for receiving two toothed wheels 17, 18. The wheel 17 is in mesh with the operating member, preferably a rack, which shifts the indicator wheel and which is not shown on the drawing, and the other wheel 18 serves for transmitting to a second indicator wheel the rotary motion of the wheel in question. On the drawing the plate 11, which carries the figure "4", is shown in position for reading, i. e. right in front of the window 2. The plates 11 are positioned in such a manner that one end portion of each plate overlaps the other end portion of the adjacent plate. Therefore, the plate which is in position for reading, will normally be covered to some extent by one of the adjacent plates. In order to completely uncover any one plate which is in position for reading, the following provision is made.

20 indicates a diaphragm, which extends right across the indicator wheel and which at each of its ends is supported by an arm 21. By means of a bar 22, guided, for example, by a cam disc, the diaphragm may be put into a reciprocating rocking motion. Shoulders 23, are formed on the diaphragm 20. When the diaphragm is rocked from its normal position shown on the drawing in downward direction, the shoulders 23 cooperate with the shoulders 12 of the plate 11 overlapping the plate which is in position for reading. Consequently, the first mentioned plate, on account of the previously mentioned shape of the plates and arms is entrained so far that the plate, which is in position for reading, is completely uncovered. After reading having taken place, the diaphragm and also the plate swung aside against its spring 19 return to their initial positions. Thus, the indicator wheel may be adjusted anew.

In addition to the fact that it is possible, in an indicator wheel according to the invention, to obtain designations that are very large and easily readable in relation to the diameter of the wheel, one more advantage is obtained in comparison with indicator wheels heretofore in use. As a matter of fact, in the said last mentioned wheels it has been necessary, when it was desired to change a designation for some reason or other, to remove and in some cases also to discard the whole strip provided with the designations. But in the indicator wheel according to the invention it is possible, without either very great costs or troubles to change any desired plate 11 and substitute another plate therefor.

Several embodiments may, of course, be devised within the scope of the invention.

Having now described my invention, what I claim as new and desire to secure by Letters Patent is:

1. An indicator wheel for cash registers and the like, comprising a wheel shaft, a part rotatable on said shaft, a plurality of arms, each extending outwardly from the center of the wheel and having one end pivoted to said rotatable part, the other ends of said arms, which are swingable in peripheral direction, each carrying an arcuate plate extending in substantially peripheral direction and normally overlapping the plate on an adjacent arm, and means to temporarily completely uncover any one of said plates disposed in reading position.

2. An indicator wheel, as claimed in claim 1, comprising further stops disposed stationary relative to the pivots of said arms and limiting the peripheral swinging movements of the latter.

3. An indicator wheel, as claimed in claim 1, comprising further spring means to normally hold said arcuate plates in overlapping positions.

4. An indicator wheel, as claimed in claim 1, in which one end portion of each plate normally overlaps the opposite end portion of the adjacent wheel.

5. An indicator wheel, as claimed in claim 1, comprising further reciprocable means for temporarily displacing the arcuate plate overlapping the plate in reading position so as to completely uncover the latter plate, and means for reciprocating said displacing means.

TORD OLOF RICKARD DAHLBERG.